United States Patent [19]

Neukam et al.

[11] Patent Number: 5,845,977
[45] Date of Patent: Dec. 8, 1998

[54] HOUSING FOR DATA-PROCESSING EQUIPMENT

[75] Inventors: Wilhelm Neukam, Augsburg; Bernd Seidel, Auerbach, both of Germany

[73] Assignee: Siemens Aktiengesellschaft, Munich, Germany

[21] Appl. No.: 875,671
[22] PCT Filed: Feb. 2, 1996
[86] PCT No.: PCT/DE96/00165
    § 371 Date: Jul. 31, 1997
    § 102(e) Date: Jul. 31, 1997
[87] PCT Pub. No.: WO96/25025
    PCT Pub. Date: Aug. 15, 1996

[30] Foreign Application Priority Data

Feb. 6, 1995 [DE] Germany .................. 195 03 801.0

[51] Int. Cl.⁶ ........................................... A47B 47/00
[52] U.S. Cl. .................... 312/223.2; 312/108; 312/263; 312/265.5; 361/683
[58] Field of Search ........................... 312/108, 263, 312/257.1, 265.5, 262, 264, 265, 223.2; 361/683, 708.1, 680

[56] References Cited

U.S. PATENT DOCUMENTS

| | | | |
|---|---|---|---|
| 3,347,609 | 10/1967 | Mann | 312/263 |
| 3,847,458 | 11/1974 | Nowak | 312/108 |
| 5,116,261 | 5/1992 | Lan et al. | |
| 5,164,886 | 11/1992 | Chang. | |
| 5,372,415 | 12/1994 | Tisbo et al. | 312/108 |
| 5,491,611 | 2/1996 | Stewart et al. | 312/263 X |
| 5,593,219 | 1/1997 | Ho | 312/263 |
| 5,645,332 | 7/1997 | Snoke et al. | 312/257.1 |

FOREIGN PATENT DOCUMENTS

| | | |
|---|---|---|
| 0 234 294 | 4/1993 | European Pat. Off. . |
| 94 04 470 | 6/1994 | Germany . |

*Primary Examiner*—Peter M. Cuomo
*Assistant Examiner*—Stephen Vu
*Attorney, Agent, or Firm*—Hill & Simpson

[57] ABSTRACT

A housing has a frame including a top wall, a front wall, a rear wall and open side surfaces. The housing also has a pair of side wall sections, a cover section, and a front panel. The front panel is placed over the front wall and includes locking catches received in openings in the frame. The side wall sections are assembled to the frame over the open side surfaces so that they cover the locking catches. The side wall sections include snap-in catches received in openings in the frame. The cover section is installed in a laterally offset position over the top wall and then moved laterally to an installed position wherein it covers the snap-in catches of the side wall sections. The cover section further includes a slideable bolt which in a locked position prevents the cover section from being moved to the laterally offset position.

5 Claims, 1 Drawing Sheet

U.S. Patent    Dec. 8, 1998    5,845,977
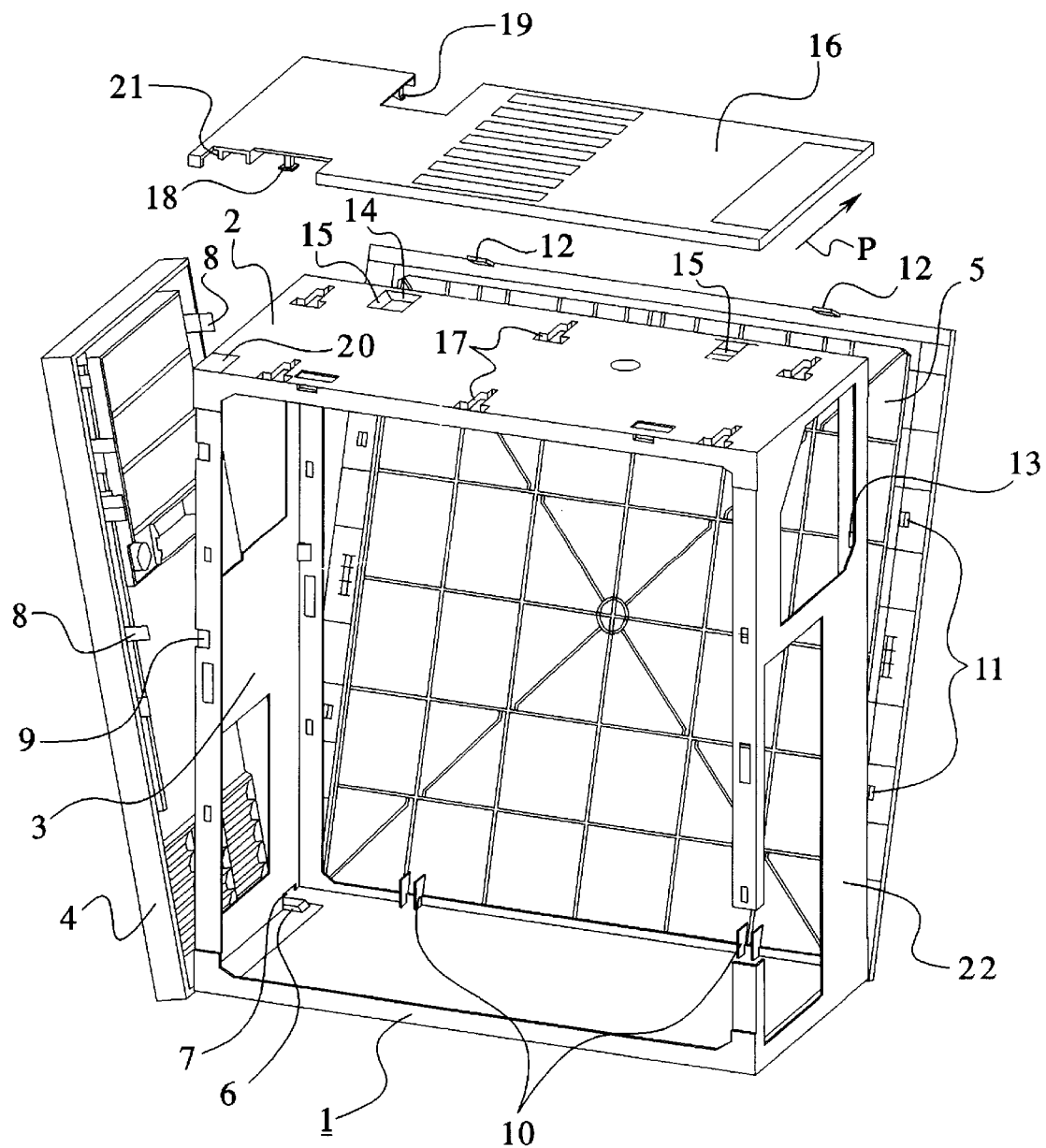

HOUSING FOR DATA-PROCESSING EQUIPMENT

FIELD OF THE INVENTION

The invention relates to a housing for data-processing equipment and particularly to a housing which is easy to assemble and yet inhibits unauthorized access.

BACKGROUND OF THE INVENTION

A housing of this type is generally described, for example, in European Patent No. EP 0 234 294-A1. The housing described therein, on the one hand, includes outer paneling which can be easily assembled. On the other hand, the housing is secure enough that unauthorized opening of the housing damages the housing panels the damage immediately evident without any difficulty.

The housing described in EP 0 234 294-A1 is constructed by successive steps including first, fastening side wall sections and, if appropriate, a front wall with the aide of catch elements. Second, the cover is fitted to and securely screwed on the side wall sections, covering the fastening elements of the front and side wall sections. Third, the rear wall is then hooked into and secured by catches to the housing, again covering the fastening screws of the cover section. Last, the rear wall is locked into place with the aide of a key-operable lock. The housing can therefore only be properly opened by use of the appropriate key.

SUMMARY OF THE INVENTION

An object of the present invention is to provide a housing which is closed on all sides by side walls and a cover section in such a way that external assembly of the housing can be carried out without any tools and the housing can be opened only with the aid of a key, and even then not directly. An advantage of a housing of such a construction is that, while dispensing with screw fastenings, all that is necessary is to hook in and slide on individual panelling elements of the housing. A further advantage is that, even when the lock is open, the housing is not directly accessible via the housing wall section containing the lock. In one embodiment, the lock is held on a housing wall section, yet the housing is accessible through the cover section, which may be unlocked and removed only by opening the lock.

These and other advantages will become more apparent with reference to the following detailed description and accompanying drawings.

BRIEF DESCRIPTION OF THE DRAWINGS

FIG. 1 illustrates an exploded view in perspective of a housing constructed in accordance with one embodiment of the present invention.

DETAILED DESCRIPTION OF THE PREFERRED EMBODIMENTS

An exemplary embodiment of the invention is explained in more detail below with reference to the drawing.

FIG. 1 illustrates a perspective exploded representation of the basic construction of a housing for data systems equipment, for example for a personal computer of a tower design. The housing comprises a cuboidal frame 1 with a top surface 2, front wall 3, rear wall 22 and open side surfaces. For covering the two side surfaces, side wall sections 5 are respectively provided. The side wall section assigned to the front side surface is not shown in the drawing for better illustrating the overall construction of the housing.

Final assembly of the frame 1, which may be fitted inside with printed circuit boards, power supply devices and other functional units, is done in the following manner. First the front panel 4 is hooked in behind the frame 1, by means of two catches 6 provided at the lower end, into corresponding openings 7 on the front wall 3 and subsequently swinging the panel towards the front wall 3. When doing so, two locking catches 8, respectively provided on the longitudinal edges of the front panel, grip around the frame and engage in openings 9 provided on the frame 1. After fastening the front panel 4, assembly of the two side wall sections 5 is accomplished first by retaining catches 10, provided on the lower edge of the side wall sections which engage behind the lower transverse member of the frame 1. As the side wall sections 5 are rotated or swung about retaining catches 10 toward the frame 1, a plurality of snap-in catches 11, 12 engage in associated openings 13, 14 on the side edges and on the upper edge of the side wall section 5. In the region of the upper snap-in catches 12, the top surface 2 of the frame 1 has additional openings 15, through which these snap-in catches 12 can be released of unlocked again. After the assembly of the side wall sections, the blocking catches 8 of the front panel 4 are covered and are consequently no longer accessible.

As the next step, a cover section 16 is assembled on the top surface 2 of the frame 1. For this purpose, the top surface 2 has a plurality of keyhole-like openings 17, adopted to receive gripping catches 18, provided on the inner side of the cover section 16. The openings 17 are arranged in such a way that, after placing the cover on the frame in a laterally offset position, the cover section 16 is subsequently displaceable into a proper position, congruent with the top surface 2 (see arrow P). On the inner side of the cover section 16, angular catch element 19 are provided on the longitudinal edge facing the rear side wall section, respectively in line with the snap-in catches 12. The catch elements 19 enter into the openings 15 in the top surface 2 which correspound to the snap-in catches 12. The catch elements engage under the snap-in catches 12 during the lateral displacing of the cover section 16. In this way, the upper snap-in catches 12 of the side wall sections are covered and in addition, concerned, are also mechanically locked.

In order to lock the cover section 16 adequately, there is provided in the top surface 2 a bolt 20, which can be moved perpendicularly with respect to the plane of the top surface 2 in a shaft-like guide. The bolt 20 can be pushed out of the top surface 2 by means of a lock, to be precise can be pushed in front of a locking element 21 provided on the inner side of the cover section 16, so that the cover section 16 can no longer be slid back when the bolt 20 is in the locked state. The lock, which can move the bolt 20 by means of an eccentrically mounted lever for example, is preferably located in the front panel 4.

While certain specific embodiments have been disclosed herein, the invention may be embodied in other specific forms without departing from the spirit of the invention. The described embodiments are therefore to be considered illustrative and not restrictive. The scope of the invention is limited only by the appended claims and all modifications which fall within the meaning and scope thereof.

What is claimed is:

1. A housing for a data-processing equipment comprising:
    a frame having a top wall, a rear wall, a front wall and a pair of open side surfaces;
    a front panel received over the front wall and having at least one retaining element engaging behind the frame, and at least two locking catches received in openings on the frame and engaging with the frame;

a side wall section received over each said open side surface, having at least one retaining catch engaging behind the frame, and at least one snap-in catch received in corresponding said openings in the frame, wherein at least one of said snap-in catches is releasable through an opening in the top wall corresponding to each of the snap-in catches, and each side wall section is fastened in order that the locking catches of the front panel are covered thereby;

a cover section received over the top wall, the cover surface having one or more gripping catches on an inner surface;

a plurality of keyhole configured openings in the top wall for receiving at least one of said gripping catches, the keyhole openings are arranged so that the cover section is assembled to the frame in a laterally offset position and then displaced to an installed position overlying the top wall, wherein the cover section covers the snap-in catches of the side wall sections;

a lock disposed on the front panel coupled to a slidable bolt moving out of the top wall and pushing in front of a locking element provided on the inner side of the cover section for preventing the cover section from returning to the laterally offset position when in a locked state.

2. A housing for a data-processing equipment comprising:

a frame having a top wall, a rear wall a front wall and a pair of open side surfaces;

a front panel received over the front wall and having at least one retaining element engaging behind the frame, and at least two locking catches received in openings on the frame and engaging with the frame;

a side wall section received over each said open side surface, having at least one retaining catch engaging behind the frame, and at least snap-in catch received in corresponding said openings in the frame, wherein at least one of said snap-in catches is releasable through an opening in the top wall corresponding to each of the snap-in catches;

a cover section received over the top wall, the cover surface having one or more gripping catches on an inner surface;

a plurality of keyhole configured openings in the top wall each for receiving a at least one of said gripping catches, the keyhole openings are arranged so that the cover section is assembled to the frame in a laterally offset position and then displaced to an installed position overlying the top wall;

a lock disposed on the front panel coupled to a slidable bolt on the top wall for preventing the cover section from returning to the laterally offset position when in a locked state; and angular catch elements on the inner surface of the cover section, the angular catch elements received in the openings which correspond to the snap-in catches of the side wall sections and engage beneath the snap-in catches as the cover section is laterally displaced to the installed position.

3. A housing for a data-processing equipment comprising:

a frame having a top wall a rear wall, a front wall and a pair of open side surfaces;

a front panel received over the front wall and having at least one retaining element engaging behind the frame,
and at least two locking catches received in openings on the frame and engaging with the frame;

a side wall section received over each said open side surface, each having at least one retaining catch engaging behind the frame, and at least one snap-in catch received in corresponding said openings in the frame, wherein at least one of said snap-in catches is releasable through an opening in the top wall corresponding to each of the snap-in catches;

a cover section received over the top wall, the cover surface having one or more gripping catches on an inner surface;

a plurality of keyhole configured openings in the top wall each for receiving a at least one of said gripping catches, the keyhole openings are arranged so that the cover section is assembled to the frame in a laterally offset position and then displaced to an installed position overlying the top wall;

a lock disposed on the front panel coupled to a slidable bolt on the top wall for preventing the cover section from returning to the laterally offset position when in a locked state; and at least said one retaining element on the front panel being received on a lower end thereof wherein the front panel rotates about the lower end when installed.

4. A housing for a data-processing equipment comprising:

a frame having a top wall, a rear wall, a front wall and a pair of open side surfaces;

a front panel received over the front wall and having at least one retaining element engaging behind the frame, and at least two locking catches received in openings on the frame and engaging with the frame;

a side wall section received over each said open side surface, having at least one retaining catch engaging behind the frame, and at least one snap-in catch received in corresponding said openings in the frame, wherein at least one of said snap-in catches is releasable through an opening in the top wall corresponding to each of the snap-in catche;

a cover section received over the top wall, the cover surface having one or more gripping catches on an inner surface;

a plurality of keyhole configured openings in the top wall each for receiving a at least one of said gripping catches, the keyhole openings are arranged so that the cover section is assembled to the frame in a laterally offset position and then displaced to an installed position overlying the top wall;

a lock disposed on the front panel coupled to a slidable bolt on the top wall for preventing the cover section from returning to the laterally offset position when in a locked state; and at least said one retaining catch being provided on a lower edge of each of the side wall sections.

5. A housing for a data-processing equipment comprising:

a frame having a top wall, a rear wall, a front wall and a pair of open side surfaces;

a front panel received over the front wall and having at least one retaining element engaging behind the frame, and at least two locking catches received in openings on the frame and engaging with the frame;

a side wall section received over each said open side surface having at least one retaining catch engaging behind the frame, and at least one snap-in catch received in corresponding said openings in the frame, wherein at least one of said snap-in catches is releasable through an opening in the top wall corresponding to each of the snap-in catches;

a cover section received over the top wall, the cover surface having one or more gripping catches on an inner surface;

a plurality of keyhole configured openings in the top wall each for receiving a at least one of said gripping catches, the keyhole openings are arranged so that the cover section is assembled to the frame in a laterally offset position and then displaced to an installed position overlying the top wall;

a lock disposed on the front panel coupled to a slidable bolt on the top wall for preventing the cover section from returning to the laterally offset position when in a locked state; and each of the side wall sections including at least two snap-in catches, respectively, on a lateral and an upper edge of each of the side wall sections.

\* \* \* \* \*